United States Patent
Peterson et al.

(10) Patent No.: US 10,602,451 B2
(45) Date of Patent: Mar. 24, 2020

(54) DISABLING AN APPLICATION BASED ON POWER LEVEL

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/144,507

(22) Filed: May 2, 2016

(65) Prior Publication Data
US 2017/0318540 A1 Nov. 2, 2017

(51) Int. Cl.
*H04W 52/02* (2009.01)
*H04W 4/02* (2018.01)

(52) U.S. Cl.
CPC ....... *H04W 52/0264* (2013.01); *H04W 4/023* (2013.01); *H04W 4/025* (2013.01); *H04W 52/0258* (2013.01); *H04W 52/0277* (2013.01); *Y02D 70/142* (2018.01); *Y02D 70/164* (2018.01); *Y02D 70/166* (2018.01); *Y02D 70/26* (2018.01)

(58) Field of Classification Search
CPC ............. H04W 52/027; H04W 52/028; H04W 52/0258
See application file for complete search history.

(56) References Cited

U.S. PATENT DOCUMENTS

| | | | | |
|---|---|---|---|---|
| 2012/0260118 | A1* | 10/2012 | Jiang | G06F 9/4843 713/340 |
| 2013/0262891 | A1* | 10/2013 | Gudlavenkatasiva | G06F 1/3212 713/320 |
| 2014/0148192 | A1* | 5/2014 | Hodges | H04W 4/025 455/456.1 |
| 2014/0180438 | A1* | 6/2014 | Hodges | H04N 21/44222 700/11 |
| 2015/0153810 | A1* | 6/2015 | Sasidharan | G06F 1/3212 713/320 |
| 2017/0289914 | A1* | 10/2017 | Brown | H04W 52/0258 |

FOREIGN PATENT DOCUMENTS

| | | |
|---|---|---|
| CN | 101778164 A | 7/2010 |
| CN | 103493017 A | 1/2014 |
| CN | 104516479 A | 4/2015 |
| CN | 105511589 A | 4/2016 |

\* cited by examiner

*Primary Examiner* — Dong-Chang Shiue
(74) *Attorney, Agent, or Firm* — Ference & Associates LLC

(57) ABSTRACT

One embodiment provides a method, including: identifying, using a processor, a power level of an information handling device; determining, using a processor, that the power level is below a predetermined threshold; and disabling, based upon the power level being below the predetermined threshold, access to at least one application of the information handling device. Other aspects are described and claimed.

20 Claims, 3 Drawing Sheets

DISABLING AN APPLICATION BASED ON POWER LEVEL

BACKGROUND

As the functionality of information handling devices (e.g., smart phones, tablets, cellular phones, smart watches, gaming systems, etc.) increases, the power requirements of these devices also increase. For example, smart phones not only allow you to send and receive communications (e.g., text messages, phone calls, instant messages, etc.), but also provide a user with additional applications. For example, a user can access the Internet and play games on the phone. Maintaining the network connection for an Internet connection and displaying the graphics associated with playing games can be very power intensive.

BRIEF SUMMARY

In summary, one aspect provides a method, comprising: identifying, using a processor, a power level of an information handling device; determining, using a processor, that the power level is below a predetermined threshold; and disabling, based upon the power level being below the predetermined threshold, access to at least one application of the information handling device.

Another aspect provides an information handling device, comprising: a processor; a memory device that stores instructions executable by the processor to: identify a power level of an information handling device; determine that the power level is below a predetermined threshold; and disable, based upon the power level being below the predetermined threshold, access to at least one application of the information handling device.

A further aspect provides a product, comprising: a storage device that stores code executable by a processor, the code being executable by the processor and comprising: code that identifies a power level of an information handling device; code that determines that the power level is below a predetermined threshold; and code that disables, based upon the power level being below the predetermined threshold, access to at least one application of the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
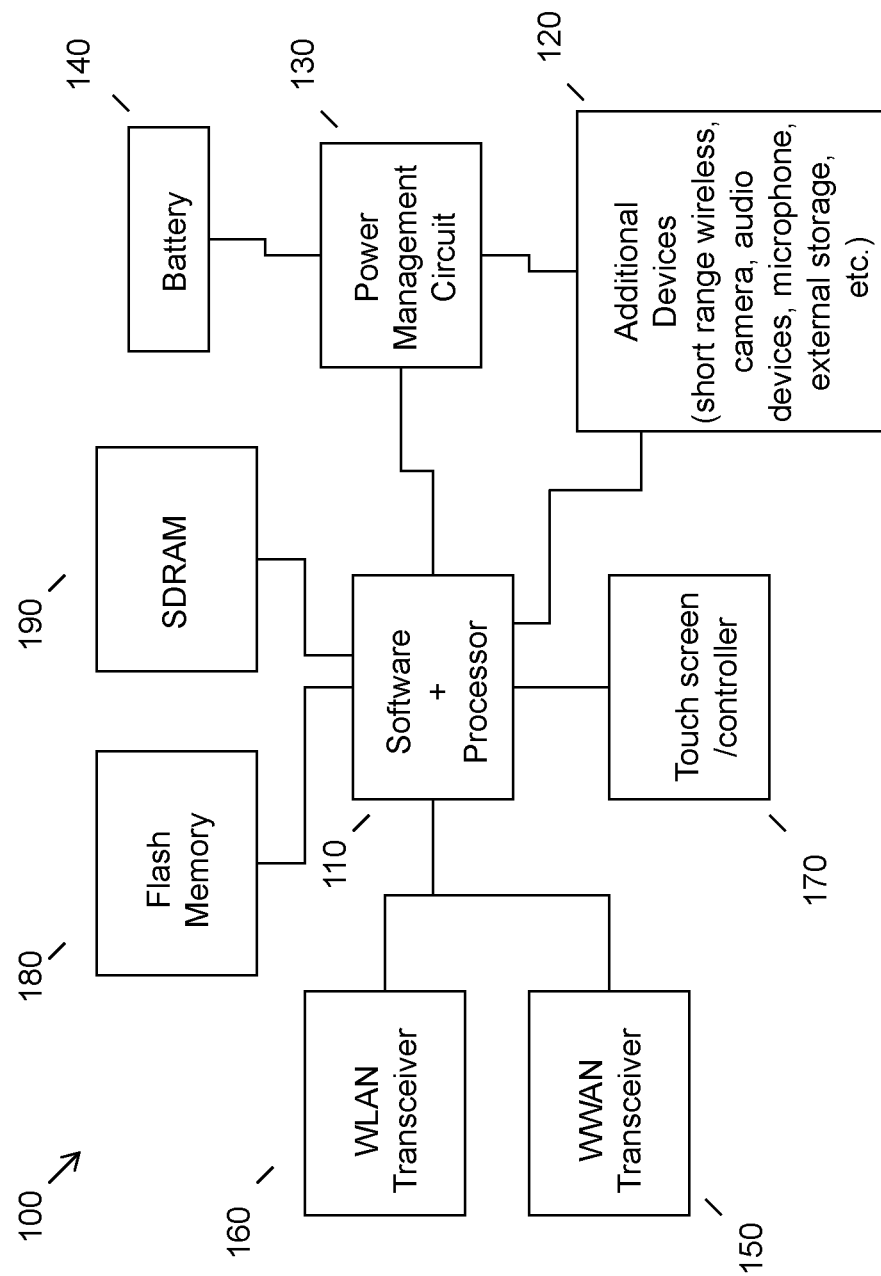
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As the functionality of information handling devices increases, users install more and more applications to increase the user's enjoyment and function of the device. However, as a user installs more applications, the user also uses the device more frequently. This causes the device to use more power, which, in the case of a mobile device, is typically a battery. Thus, the user can run the battery of the device down to a level at which the device is no longer functional for any purpose, including the device's primary purpose of providing a user with the ability to communicate with others. For example, a child may have a smart phone for safety reasons. Specifically, the parent wants to be able to get a hold of the child at any time or allow the child to contact the parent or authorities if the need arises. If the child plays games or accesses social media sites during the day, the battery of the device may run down and the child can no longer communicate with the parent. Therefore, the parent may become frustrated at the inability to contact the child when desired.

One solution has been to restrict usage of a device during particular times. For example, a parent or user may set up restrictions on the device to make it so that the device will not allow access to applications or other content during certain times of the day (e.g., during the school day, between certain hours, etc.). However, these types of restrictions may prevent complete usage of the device. This results in a restriction of communication, which may be undesirable. Additionally, even if the device will still allow communication functions under these restrictions, a user may not want to restrict use of the device. Instead, the user just does not want the device to be nonfunctional because of low or no power when the user needs to contact the person having the device.

Another option allows a user to set up restrictions of certain applications or content. For example, the device may not allow access to social media sites, applications requiring an Internet connection, or other applications. A less severe modification of this restriction is restricting applications only during particular times. Again, the user may not care about or want to restrict usage of certain applications. Rather, the user just wants the device to be operable when the user needs to contact the holder of the device.

To assist in reducing the power needs of the device some power management schemes exist. These schemes may decrease or turn off functions of the device when the battery level gets to a certain threshold. For example, the wireless connection may be turned off, the screen may change to a color scheme which requires less power, and the like. However, these power management schemes do not assist in preventing the use of applications that are big contributors to the use of power. Rather, the current power management schemes only disable and/or modify functions of the device itself, rather than applications running on the device.

These technical issues present problems for users wanting to decrease the depletion of a battery of a device without making tedious or undesirable restrictions. Current approaches result in an all-or-nothing approach, where the user has to restrict applications at all times or usage of the device during particular times. This can be very cumbersome and tedious to implement, especially if the person restricting the device is not concerned about the time of usage or the applications that are accessed. Rather, if the user is mainly concerned about battery depletion, the user does not have a good method for helping prevent battery depletion based upon applications used or accessed. Some power management schemes assist in reducing the depletion of the battery. However, such schemes only focus on functions of the device, rather than the accessibility of applications, which can be the biggest cause of power depletion.

Accordingly, an embodiment provides a method of managing accessibility of applications based upon the power level of the information handling device. An embodiment may identify that the power level of the device has dropped below a certain threshold and thereupon disable applications. In one embodiment, disabling the applications may include only disabling a subset of applications installed on or accessible by the information handling device. For example, as the power level of the device drops, an embodiment may only disable applications that are the most power intensive. In one embodiment, the applications disabled may be based upon the frequency of use of the application. For example, applications that are frequently used may be disabled first. Alternatively, an embodiment may disable all applications except those that allow communications between devices. For example, all applications except for text messaging and calling applications may be disabled.

One embodiment may additionally identify the location of the information handling device. Based upon the location and power level of the device, an embodiment may determine whether to disable applications. For example, if the device is located at home, an embodiment may not disable any applications. As another example, if the device is located within proximity to other devices within a group, an embodiment may not disable any applications. For example, if the device is a child's phone and is identified as being within proximity of a parent's phone, then no applications may be disabled. In other words, the location of the information handling device may augment or override the disabling of applications based upon the power level.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., short range wireless communication devices, audio devices, etc. System 100 often includes a touch screen 170 for data input and display/rendering. System 100 also typically includes various memory devices, for example flash memory 180 and SDRAM 190.

Figure 2:
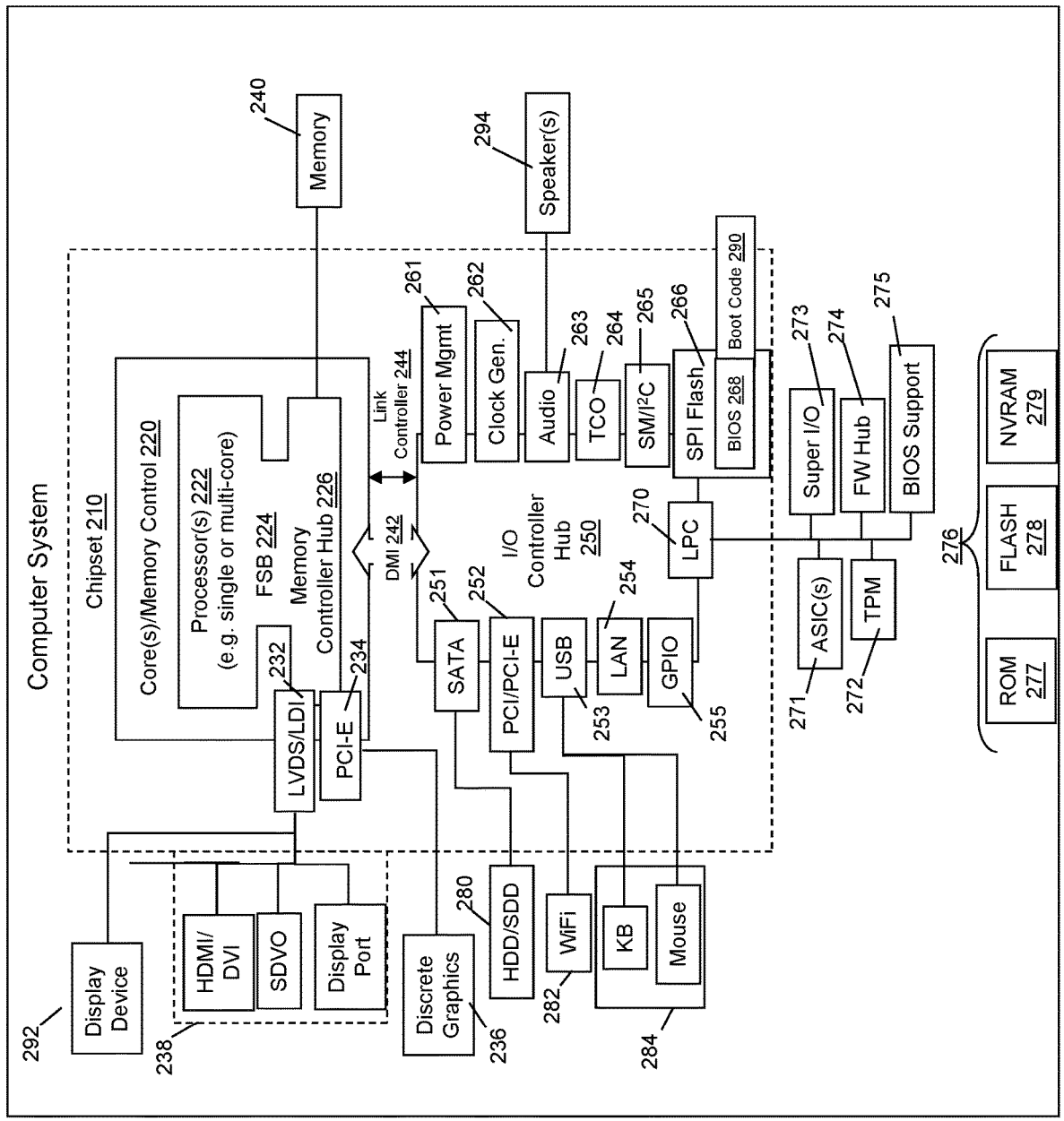
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use for communicating with other users. Such devices may also allow users to install and use applications. For example, the circuitry outlined in FIG. 1 may be implemented in a tablet or smart phone embodiment, whereas the circuitry outlined in FIG. 2 may be implemented in a personal computer embodiment.

Figure 3:
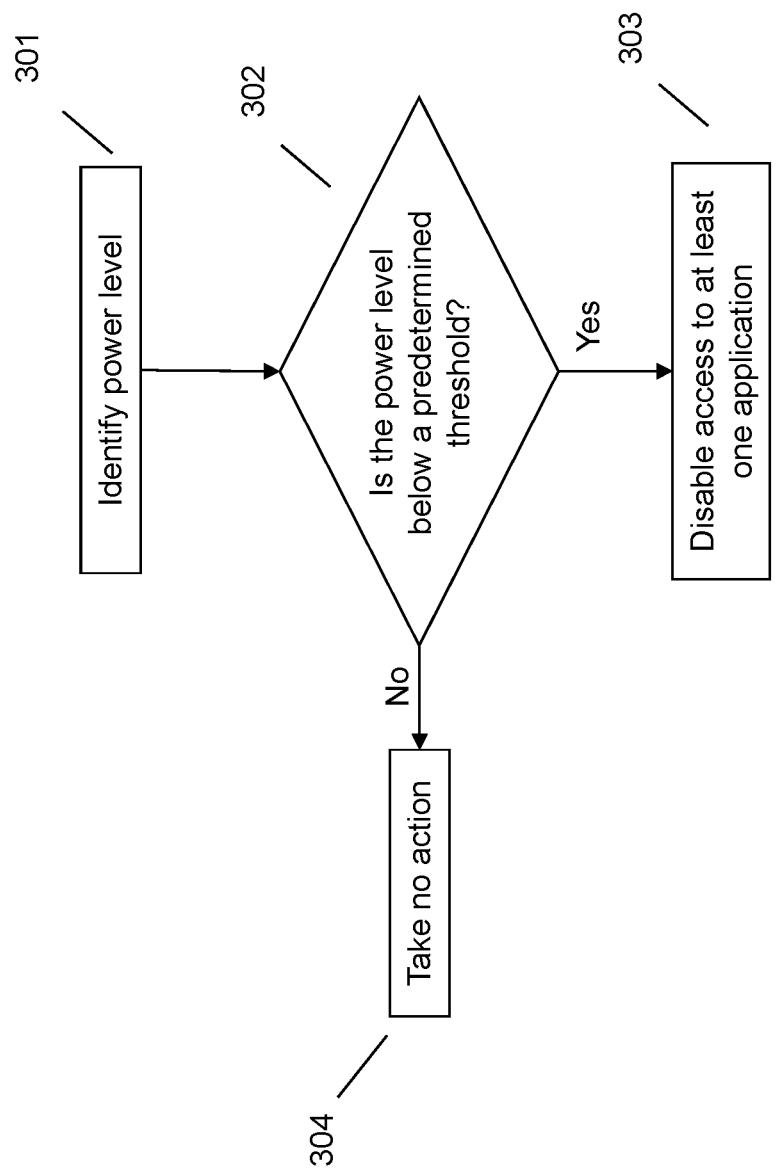
FIG. 3 illustrates an example method of disabling an application based upon power level.

Referring now to FIG. 3, at 301, an embodiment may identify the power level of an information handling device. In identifying the power level, an embodiment may communicate with the device system. For example, an embodiment may communicate with the power management system software to determine the power level. One embodiment may communicate directly with the power source (e.g., battery, power cells, converters, etc.) to determine the power level of the device. Other methods of identifying the power level of the device are possible and contemplated.

At 302, an embodiment may determine whether the power level of the device has met or is below a predetermined threshold. The threshold may be a default value or may be user-defined. For example, a user can identify at which power level they want an embodiment to take action. An embodiment may also determine if the power level is between two different thresholds. For example, an embodiment may take one action if the power level is below 50% and may take a different action if the power level of the device continues to decrease and falls below 25%. The threshold may be identified in terms of a percentage of the power level (e.g., 25%, 50%, etc.), a value of the power level (e.g., two bars, a certain number of charged battery cells, etc.), an amount of battery time remaining (e.g., two hours remaining, thirty minutes remaining, etc.) and the like.

If an embodiment determines that the power level has not fallen below a predetermined threshold, an embodiment may take no action at 304 and may additionally continue to monitor the power level of the device. Additionally, an embodiment may determine whether the device is connected to an external power source (e.g., A/C adapter, wireless charger, car charger, etc.). If the device is connected to an external power source, an embodiment may not take any action even if the power level is below the predetermined threshold.

If, however, the power level of the device is below the predetermined threshold, an embodiment may disable at least one application at 303. An application may be any software or computer program designed to run on the device, including built in software applications. For example, a smart phone may include social media applications, text messaging applications, games, word processing applications, banking applications, communication applications, and the like. Disabling applications may be accomplished using a phased approach. For example, an embodiment may disable a certain number of applications if a first threshold is reached and an additional number of applications if a second threshold is reached. As can be understood, more than two thresholds may be implemented.

An embodiment may disable all applications except communication applications. A communication application may include an application built into the software of the device, a standalone application, installed application, or the like. Example communication applications may include text messaging applications, calling applications, instant messaging applications, and the like. An embodiment may disable all applications except a particular communication application. For example, an embodiment may disable all applications, including communication applications, except for a calling application. Thus, the device would allow a user to perform communication functions, but would not allow the user to access any other applications, thereby reducing the power needs of the device.

Additionally, an embodiment may disable the communication applications except to allow communications to predefined or previously identified devices or users. For example, a parent may set up restrictions on a child's phone that only allow the child to place a call or receive a call to the parent's phone or device. These restrictions may be set up using known methods, for example, through the device provider's website, through a training mode of the device, through an emergency contact mode of the device, and the like. Such restrictions may prevent the user from texting or calling unnecessarily and running down the battery of the device.

In disabling an application, an embodiment may identify the application(s) that consume the most power. For example, an embodiment may keep track of the historical power usage of the applications on the device. Based upon the historical power usage data, an embodiment may determine which applications require or consume the most power when enabled. These applications may then be disabled when the power level of the device gets below the predetermined threshold. An embodiment may not disable all applications that use power. Rather, as discussed above, an embodiment may use a phased approach to disabling applications. For example, when the power level of the device gets to a first threshold, the top three applications that use the most power may be disabled. When the power level of the device gets to a second threshold, the next three applications that use the most power may be disabled, and so on. Thus, not all applications may be disabled at a defined threshold.

In one embodiment, the applications that are disabled may be based on the applications that are most frequently used by the user of the device. For example, if a user most frequently accesses a game application, this application may be disabled first. An embodiment may determine the most frequently used application through the user history, the amount of time an application is used, the most recently used applications, and the like. As with the disabling of applications based upon power requirements of the applications, disabling applications based upon the use of the applications may be accomplished using a phased approach.

Other methods for disabling applications are contemplated and may be implemented. For example, applications may be disabled based upon user settings. For example, a user may set up the system to identify which applications should be disabled upon reaching the particular thresholds. The user may define particular applications to disable. Alternatively, the user may define the method by which applications should be disabled, for example, the applications using the most power, the most frequently used applications, and the like. Additionally, the disabling of applications may also be implemented during particular time periods. For example, the systems and methods described herein could be applied only during daytime hours or only during certain days of the week. The time frame may be a default or user defined time period, and may be implemented using the device carrier's website, on the device itself, and the like.

In one embodiment the location of the device may be identified. The disabling of the application(s) may then be augmented or overridden by the location of the device. In other words, the disabling of the applications may be additionally based upon the location of the device. In one embodiment, the location may include the geographical location of the device. For example, an embodiment may identify where the device is located using global positioning system (GPS) coordinates, cellular tower connections, network connections, and the like. In determining the location of the device, the location identified may be compared to a list of known or predefined locations, connections, coordinates, or the like. For example, a user may preset particular GPS coordinates as "Home." As another example, a device may identify the network connection as "Work." The location of the device may also be identified based upon a pattern of the user. For example, a device may identify that a user is at one location Monday-Friday between 8 a.m. and 5 p.m. and identify this location as work.

An embodiment may then identify whether applications should be disabled based upon the power level and the location of the device. For example, if the device is located at home, applications may not be disabled based on the assumption that the device could be connected to an external power source when the power level is too low. Alternatively, applications may still be disabled; however, the thresholds may be modified. For example, the threshold for disabling the applications may be changed from a 50% power level to a 25% power level.

One embodiment may not identify the geographical location of the device. Rather, an embodiment may identify where the device is in relation to or with respect to other devices. The other devices may be previously identified. For example, a user may set up a group that includes particular devices. The other devices may also be identified based upon historical information. For example, an embodiment may identify particular devices as related to or within a group based upon the frequency that the devices are in proximity to each other. As another method, the device may identify the devices having phone numbers, identifiers, and the like, associated with the same account as the device, as being in a group. If an embodiment determines that the device is in proximity to the other devices, the disabling of applications may be ignored or augmented. For example, if a spouse's tablet is in proximity to the other spouse's phone, an embodiment may determine that no applications should be disabled based on the assumption that if the spouse needs to contact the other spouse then they could verbally communicate with each other.

The various embodiments described herein thus represent a technical improvement to standard methods of preventing power depletion of a device. Using the techniques described herein, an embodiment may disable applications, which may be the biggest culprits of power usage, when the power level of the device gets to a predetermined threshold. In determining which applications to disable, embodiments may use different methods as described herein. Additionally, the disabling of applications may be augmented or overridden based upon the location of the device. Thus, embodiments provide systems and methods to prevent power depletion using application management, rather than device or power management schemes as previously known.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
identifying, using a processor, a power level of an information handling device comprising a plurality of applications; and
disabling, using a phased approach based upon the power level and a power management scheme defined by another user who is different than a user of the information handling device, a historical power consumption, and historical usage identifying a frequency of use associated with at least one of the plurality of applications and when the information handling device is in a location identified within the power management scheme, access to at least one application of the information handling device, wherein the phased approach preferentially disables applications frequently used by the user of the information handling device and applications consuming the most power, wherein the disabling preserves applications associated with communication on the device;
wherein the disabling access to the at least one application, is augmented based upon a proximity of the information handling device to another electronic device.

2. The method of claim 1, wherein the disabling comprises disabling access to an application based upon an amount of power used by the application.

3. The method of claim 1, wherein the disabling comprises disabling access to an application based upon a historical use of the application.

4. The method of claim 1, wherein the disabling comprises disabling access to all applications except at least one communication application.

5. The method of claim 4, wherein the at least one communication application only allows communications between the information handling device and at least one previously identified device.

6. The method of claim 1, further comprising identifying a location of the information handling device;
wherein the disabling is additionally based upon the location of the information handling device.

7. The method of claim 6, wherein the identifying a location comprises identifying the geographical location of the information handling device.

8. The method of claim 6, wherein the identifying a location comprises identifying the location of the information handling device with respect to at least one other predetermined information handling device.

9. The method of claim 6, wherein the location of the information handling device overrides the disabling access to at least one application based upon the power level being below the predetermined threshold.

10. The method of claim 1, wherein the disabling comprises disabling access to an application based upon a user identified selection.

11. An information handling device, comprising:
a processor;
a memory device that stores instructions executable by the processor to:
identify a power level of an information handling device comprising a plurality of applications; and
disable, using a phased approach and based upon the power level and a power management scheme defined by a another user who is different than a user of the information handling device, a historical power consumption, and historical usage identifying a frequency of use associated with at least one of the plurality of applications and when the information handling device is in a location identified within the power management scheme, access to at least one application of the information handling device, wherein the phased approach preferentially disables applications frequently used by the user of the information handling device and applications consuming the most power, wherein the disabling preserves applications associated with communication on the device;
wherein, the disabling access to the at least one application, is augmented based upon a proximity of the information handling device to the another electronic device.

12. The information handling device of claim 11, wherein the instructions to disable comprise instructions to disable access to an application based upon an amount of power used by the application.

13. The information handling device of claim 11, wherein the instructions to disable comprise instructions to disable access to an application based upon a historical use of the application.

14. The information handling device of claim 11, wherein the instructions to disable comprise instructions to disable access to all applications except at least one communication application.

15. The information handling device of claim 14, wherein the at least one communication application only allows communications between the information handling device and at least one previously identified device.

16. The information handling device of claim 11, wherein the instructions are further executable by the processor to identify a location of the information handling device;

wherein the instructions to disable are additionally based upon the location of the information handling device.

17. The information handling device of claim 16, wherein the instructions to identify a location comprises instructions to identify the geographical location of the information handling device.

18. The information handling device of claim 16, wherein the instructions to identify a location comprises instructions to identify the location of the information handling device with respect to at least one other predetermined information handling device.

19. The information handling device of claim 16, wherein the location of the information handling device overrides the disabling access to at least one application based upon the power level being below the predetermined threshold.

20. A product, comprising:
   a storage device that stores code, the code being executable by a processor and comprising:
   code that identifies a power level of an information handling device comprising a plurality of applications; and
   code that disables, using a phased approach and based upon the power level and a power management scheme defined by another user who is different than a user of the information handling device, a historical power consumption, and historical usage identifying a frequency of use associated with at least one of the plurality of applications and when the information handling device is in a location identified within the power management scheme, access to at least one application of the information handling device, wherein the phased approach preferentially disables applications frequently used by the user of the information handling device and applications consuming the most power, wherein the disabling preserves applications associated with communication on the device;
   wherein the disabling access to the at least one application, is augmented based upon a proximity of the information handling device to another electronic device.

* * * * *